US009986428B2

(12) United States Patent
Cho et al.

(10) Patent No.: US 9,986,428 B2
(45) Date of Patent: *May 29, 2018

(54) SECURITY MANAGEMENT IN M2M AREA NETWORK

(71) Applicant: KT CORPORATION, Gyeonggi-do (KR)

(72) Inventors: Young-Bin Cho, Seoul (KR);
Sung-Chul Kim, Gyeonggi-do (KR);
Jin-Hyoung Lee, Gyeonggi-do (KR);
Youn-Pil Jeung, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 49 days.

This patent is subject to a terminal disclaimer.

(21) Appl. No.: 15/139,470

(22) Filed: Apr. 27, 2016

(65) Prior Publication Data

US 2016/0242028 A1 Aug. 18, 2016

Related U.S. Application Data

(63) Continuation of application No. 14/066,898, filed on Oct. 30, 2013, now Pat. No. 9,357,381.

(30) Foreign Application Priority Data

Oct. 30, 2012 (KR) .................. 10-2012-0121511

(51) Int. Cl.
*H04W 12/02* (2009.01)
*H04L 9/00* (2006.01)
(Continued)

(52) U.S. Cl.
CPC ............. *H04W 12/02* (2013.01); *H04L 9/006* (2013.01); *H04L 63/0428* (2013.01);
(Continued)

(58) Field of Classification Search
None
See application file for complete search history.

(56) References Cited

U.S. PATENT DOCUMENTS

2001/0042210 A1* 11/2001 Blaker ............... G06F 7/728
713/190
2002/0031352 A1* 3/2002 Saito .................. G03B 17/48
396/429
(Continued)

FOREIGN PATENT DOCUMENTS

CN 101778379 A 7/2010
JP 2011-504263 A 2/2011
(Continued)

OTHER PUBLICATIONS

Elahi (Elahi et al., "Introduction to the ZigBee Wireless Sensor and Control Network", Dec. 2009 found at http://www.informit.com/articles/article.aspx?p=1409785&segNum=2).*

(Continued)

*Primary Examiner* — Peter Poltorak
(74) *Attorney, Agent, or Firm* — IP Legal Services, LLC

(57) ABSTRACT

The disclosure is related to a machine to machine (M2M) device and a security management method thereof. The M2M device includes an identification circuit. The identification circuit may be configured to encrypt data collected from a sensor with a device identification (ID) of the M2M device and at least one subscriber ID of the identification circuit and to generate a data packet in a predetermined communication standard format by including the encrypted data in a payload of the data packet.

13 Claims, 5 Drawing Sheets

(51) Int. Cl.
*H04L 29/08* (2006.01)
*H04L 29/06* (2006.01)
*H04W 4/00* (2018.01)

(52) U.S. Cl.
CPC ............ *H04L 67/02* (2013.01); *H04L 63/045* (2013.01); *H04L 63/0442* (2013.01); *H04W 4/005* (2013.01)

(56) References Cited

U.S. PATENT DOCUMENTS

| | | | |
|---|---|---|---|
| 2002/0099663 A1 | 7/2002 | Yoshino et al. | |
| 2004/0029562 A1* | 2/2004 | Sharon | H04M 1/68 455/410 |
| 2007/0123216 A1* | 5/2007 | Cantini | H04L 63/0853 455/411 |
| 2007/0220498 A1* | 9/2007 | Madsen | G06F 9/445 717/140 |
| 2009/0122989 A1 | 5/2009 | Asnaashari et al. | |
| 2010/0192234 A1* | 7/2010 | Sugimoto | G06F 21/6209 726/30 |
| 2010/0303236 A1 | 12/2010 | Laaksonen et al. | |
| 2012/0072979 A1* | 3/2012 | Cha | G06F 21/34 726/7 |
| 2012/0182938 A1* | 7/2012 | Mujtaba | H04W 88/06 370/328 |
| 2013/0042011 A1* | 2/2013 | Sugizaki | H04W 4/005 709/227 |
| 2013/0214938 A1 | 8/2013 | Kim et al. | |
| 2013/0294041 A1* | 11/2013 | Syal | H05K 1/0275 361/764 |
| 2014/0122878 A1* | 5/2014 | Cho | H04W 12/02 713/168 |

FOREIGN PATENT DOCUMENTS

| | | |
|---|---|---|
| KR | 10-0388276 B1 | 6/2003 |
| KR | 10-2006-0069147 A | 6/2006 |
| KR | 10-2010-0043799 A | 4/2010 |
| KR | 10-2011-0100597 A | 9/2011 |
| KR | 10-2011-0100598 A | 9/2011 |
| KR | 10-1078839 B1 | 11/2011 |
| KR | 10-2012-0076529 A | 7/2012 |
| WO | 99/46746 A1 | 9/1999 |

OTHER PUBLICATIONS

Stallings (Stallings (William Stallings, "Data and computer communications", 5th edition, 1997, ISBN: 0024154253).*
Boswarthick et al., "M2M Communications: A Systems Approach", ISBN 978-1-119-99475-6, Mar. 2012.*
Boswarthick et al., "M2M Communicatinos: A System Approach", ISBN 1119994756, Mar. 2002.*
Jeff Naruchitparames et al., "Secure Communications in the Smart Grid", The 8th Annual IEEE Consumer Oommunications and Networking Conference—Special Session on Smart Grids—Emerging Services and Networks, 2011, pp. 1171-1175.
V. Cakulev et al., MIKEY-IBAKE: Identity-Based Authenticated Key Exchange (IBAKE) Mode of (RFC6267), An IP.com Prior Art Database Technical Disclosure, Jun. 2011.

* cited by examiner

SECURITY MANAGEMENT IN M2M AREA NETWORK

CROSS REFERENCE TO PRIOR APPLICATIONS

The present application is continuation application of U.S. patent application Ser. No. 14/066,898 (filed on Oct. 30, 2013), which claims priority under 35 U.S.C. § 119 to Korean Patent Application No. 10-2012-0121511 (filed on Oct. 30, 2012).

BACKGROUND

Machine to Machine (M2M) communication is a form of data communication that involves one or more entities (e.g., devices) that do not necessarily require human interaction or intervention in the process of communication. The M2M communication may also be referred to as a machine type communication (MTC) or a machine intelligence communication. The M2M communication may extend human-centered internet infrastructure to a human-to-machine domain and/or a machine-to-machine domain where information can be sensed and transmitted not by human beings but by machines. The M2M communication may be related to a ubiquitous technology.

The M2M communication may enable different types of services that are valuable to an end user. For example, M2M communication services may include smart metering, healthcare monitoring (e.g., patient monitoring), fleet management and tracking, remote security sensing, smart grid, telemetry, weather monitoring, home automation, and similar applications.

M2M architecture may include a variety of elements such as M2M devices (e.g., a sensor, an actuator, etc.), M2M area network, M2M communication network (e.g., a core network), M2M gateway (i.e., a system connecting the M2M area network and the M2M communication network), and/or an M2M application service server.

The M2M area network is formed by indirect connectivity type M2M devices and a M2M gateway using typical wireless communication technologies, such as Zigbee, ultra-wideband (UWB), and Bluetooth. In such M2M area network, a malicious device having a certain feature can scan signals transmitted from a M2M device or a M2M gateway. Based on such scanned signal, the malicious device can illegally join the M2M area network and capture personal data of M2M devices.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a machine to machine (M2M) device encrypts data with a device ID and a subscriber ID and generates a data packet in a certain communication standard format by including the encrypted data in a payload thereof.

In accordance with another aspect of the present embodiment, a M2M device includes an identification circuit containing information on a device ID and a subscriber ID and is coupled to a M2M area network.

In accordance with at least one embodiment, a security management method may be provided for a machine to machine (M2M) device having a universal integrated circuit card (UICC). The method may include encrypting data collected by a sensor with a device identification (ID) of the M2M device and at least one subscriber ID of the UICC, generating a data packet in a predetermined format by including the encrypted data in a payload of the data packet, and transmitting the generated data packet to an associated service server.

Such a method may include sensing the data associated with a target M2M service and monitoring operation status of the M2M device and collecting information on the monitored operation status. The sensed data may be encrypted with the collected information on the monitored operation status.

The encrypting data may include encrypting the data using one of a public key infrastructure (PKI) and a predetermined hashing function. The predetermined format may be a hypertext transfer protocol secure (HTTPS) format. The M2M device may be an indirect connectivity type M2M device coupled to a Zigbee M2M area network. The at least one subscriber ID may include an integrated circuit card identity (ICC ID) and an international mobile subscriber identity (IMSI).

The method may further include temporally storing the sensed data and the information on the monitored operation status in a buffer of a processor of the M2M device and storing the generated data packet in a memory of the M2M device.

In accordance with at least one embodiment, a device may include a sensor and an identification circuit, and a communication circuit. The sensor may be configured to collect data associated with a target service. The identification circuit may be configured to encrypt the collected data from the sensor with a device identification (ID) of the M2M device and at least one subscriber ID of the identification circuit and to generate a data packet in a predetermined communication standard format by including the encrypted data in a payload of the data packet. The communication circuit may be configured to transmit the generated data packet to an associated service server.

The device may further include a processor configured to monitor operation status of the M2M device and to collect information on the monitored operation status. In this case, the identification circuit may encrypt the sensed data with the collected information on the monitored operation status. The processor may include a buffer configured to temporally store the sensed data and the information on the monitored operation status. The device may include a memory configured to store the generated data packet.

In accordance with at least one embodiment, a machine to machine (M2M) device coupled to a M2M area network may include a universal integrated circuit card (UICC). The UICC may be configured to encrypt data collected by a sensor with a device identification (ID) of the M2M device and at least one subscriber ID of the UICC and to generate a data packet in a predetermined format by including the encrypted data in a payload of the data packet. Such M2M device may be an indirect connectivity type M2M device coupled to a M2M gateway through at least one of a Zigbee network, an ultra-wideband (UWB) network, and a Bluetooth network.

The UICC may include a memory configured to store a device ID of the M2M device and at least one subscriber ID including an integrated circuit card identity (ICC ID) and an international mobile subscriber identity (IMSI). The UICC may include a processor and an interface. The processor may be configured to encrypt the data using one of a public key infrastructure (PKI) and a hashing function and to generate the data packet in a hypertext transfer protocol secure (HTTPS) format. The interface may be configured to be coupled to a main processor of the M2M device.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figure 1:
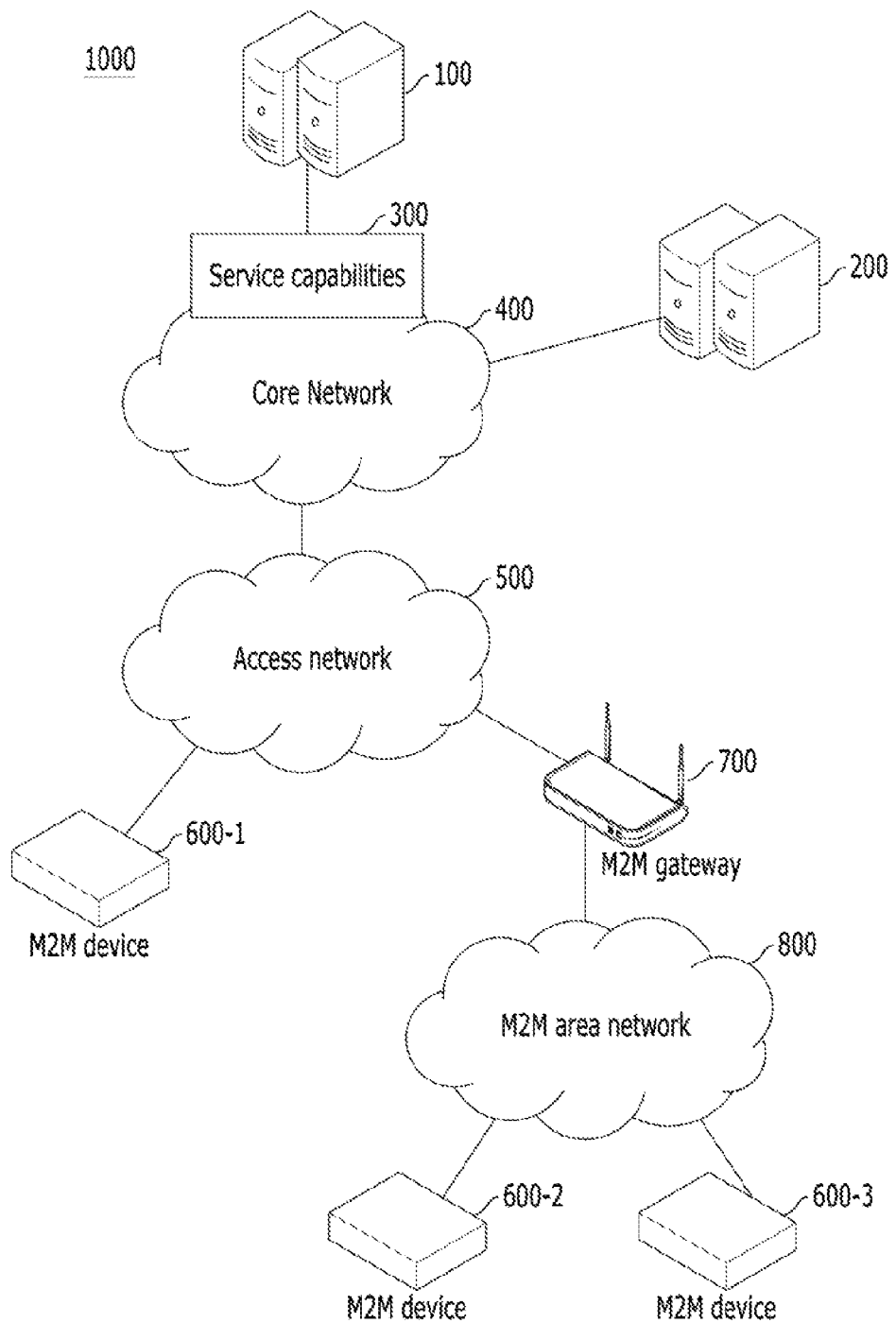
FIG. 1 illustrates a machine to machine (M2M) system in accordance with at least one embodiment.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, a machine to machine (M2M) device and a security management method thereof are provided for authenticating devices and subscribers thereof in a M2M area network and for securing data in the device. Particularly, a M2M device (e.g., indirect connectivity type M2M device) is equipped with an identification circuit (e.g., universal integrity circuit card). Such a M2M device encrypts data with a device ID of the M2M device and a subscriber ID of the identification circuit (e.g., UICC) and generates a data packet in a certain communication standard (e.g., hypertext transfer protocol secure: HTTPS) by including the encrypted data in a payload of the data packet.

Such a M2M device may be an indirect connectivity type M2M device coupled to a Zigbee network as a M2M area network and include a UICC for containing information on a device ID and a subscriber ID. Hereinafter, such a M2M device and a security management method thereof will be described based on a M2M system shown in FIG. 1 as follows.

FIG. 1 illustrates a machine to machine (M2M) system in accordance with at least one embodiment.

Referring to FIG. 1, M2M system 1000 may capture events generated in M2M devices and collect data from M2M devices coupled through communication networks, covert information on the captured events and the collected data into meaningful information, analyze the information, and provide a predetermined service to end users based on the analysis result of the meaningful information. Such predetermined service may be provided without human intervention using M2M communication technologies. M2M system 1000 may be specified in M2M international standards (e.g., European telecommunications stands institute (ETSI) technical specification (TS) 102 690). For example, M2M system 1000 may include M2M application server 100, network management server 200, M2M service capabilities 300, core network 400, access network 500, at least one of M2M devices 600-1 to 600-3, M2M gateway 700, and M2M area network 800. Such constituent elements of M2M system 1000 may be divided into an application domain, a network domain, and a device and gateway domain. The application domain may include M2M application server 100 and M2M network management server 200. The network domain may include M2M service capabilities 300, core network 400, and access network 500. The device and gateway domain may include at least one of M2M devices 600-1 to 600-3, M2M gateway 600, and M2M area network 800.

M2M application server 100 may perform predetermined service logics and use M2M service capabilities. For example, M2M application server 100 may receive information from M2M devices 600-1 to 600-3 through communication networks (e.g., core network 400 and access network 500), analyze the received information, and provide predetermined M2M service to end users based on the analysis result. The received information may be information on generated events, measured or sensed data at M2M devices 600-1 to 600-3. M2M application server 100 may process such received information by specific business processing engines in order to convert the received information to meaningful information. Based on such processed information, M2M application server 100 may perform various types of operations to provide certain M2M services. Furthermore, M2M application server 100 manages connection to M2M devices 600-1 to 600-3 through wired/wireless networks.

M2M network management server 200 may include functions and perform operations for managing core network 400 and access network 400. For example, M2M network management server 200 performs network configuration management, provisioning, supervision, subscriber management, and fault management. In addition, M2M network management server 200 may perform security management required in M2M service. M2M network management server 200 may include M2M management functions required to manage M2M service capabilities 300 in the network domain.

As described, the network domain includes M2M service capabilities 300, core network 400, and access network 500. The network domain connects the application domain and with the device and gateway domain. That is, access network 500 and core network 400 may be a transport network for data communication between the application domain and the device and gateway domain. M2M service capabilities 300 may form the interface between M2M application server 100 and communication networks (e.g., core network 300 and access network 400). M2M service capabilities 300 may provide M2M functions that are to be shared by different applications and use core network functionalities.

Access network 500 allows the M2M device and gateway domain to communicate with core network 400. Access network 500 includes various types of wired or wireless access networks. Access network 500 includes a wideband code division multiple access (WCDMA) network, a worldwide interoperability for microwave access (WiMAX) network, wireless fidelity (WiFi) network, a long term revolution (LTE) network, x digital subscriber line (xDSL) network, hybrid fiber-coaxial (HFC) network, a satellite network, a global system for mobile communication (GSM) edge radio access network (GERAN), a universal terrestrial radio access network (UTRAN), and an evolved universal terrestrial radio access network (E-UTRAN), and a wireless local area network (W-LAN), but the present invention is not limited thereto. Access network 500 performs security management functions for security between M2M devices and access network 500.

Core network 400 may provide IP connectivity at a minimum and potentially other connectivity means, service and network control functions, interconnection with other networks, roaming, and so forth. Core network 400 may include a public switched telephone network (PSTN), an integrated services for digital network (ISDN), international mobile telecommunications (IMT)-2000, a wired area network (WAN), a local area network (LAN), a cable television (CATV), third generation partnership project core networks (3GPP-CNs), an European telecommunications standards institute telecommunication & internet converged service & protocols for advanced networks core network (ETSI TISPAN CN), and a 3GPP2 CN.

The device and gateway domain is coupled to the application domain (e.g., application server 100) through the network domain. Such a device and gateway domain includes M2M devices 600-1 to 600-3, M2M area network 800, and M2M gateway 700. M2M devices 600-1 to 600-3 might be a device that runs M2M applications using M2M service capabilities.

M2M devices 600-1 to 600-3 capture predetermined events, measure or sense data and provide information on the captured events and the measured or sensed data to M2M application server 100 through access network 500 and core network 400. Such M2M devices 600-1 to 600-3 may be classified into a direct connectivity type M2M device and an indirect connectivity type M2M device based on manners of connection to the network domain.

The direct connectivity type M2M device (e.g., M2M device 600-1) connects to the network domain through access network 500. The direct connectivity type M2M device performs procedures such as registration, authentication, authorization, management, and provisioning with the network domain. The direct connectivity type M2M device may provide service to other devices (e.g., legacy) connected to it that are hidden from the network domain.

The indirect connectivity type M2M device (e.g., M2M devices 600-2 or 600-3) connects to the network domain via M2M gateway 700 and connects to M2M gateway 700 using M2M area network 800. M2M gateway 700 acts as a proxy for the network domain towards M2M devices 600-2 and 600-3 that are connected to it. The indirect connectivity type M2M device performs authentication, authorization, management, and provisioning. Such indirect connectivity type M2M device may be a remote device (e.g., a healthcare device), an off-line payment device (e.g., point of sale (POS) terminal) for accepting a payment made through a payment card including a smart card, or a mobile payment device (e.g., a smart phone). Particularly, the indirect connectivity type M2M device may not include M2M capabilities.

M2M area network 800 provides connectivity between indirect connectivity type M2M devices 600-2 and 600-3 and M2M gateway 700. M2M area network 800 also provides such connectivity not only to M2M devices compliant to ETSI M2M but also to a device noncompliant to ETSI M2M. That is, a typical device, not running M2M applications using M2M capabilities, can be coupled to M2M area network 800. For example, M2M area network 800 provides connectivity between a typical device and M2M gateway 700 as well as connectivity between indirect connectivity type M2M devices 600-2 and 600-3 and M2M gateway 700. M2M area network 800 independently performs network configuration, data communication, management, and maintenance. M2M area network 800 includes a personal area network (PAN) and a local network. For example, the PAN includes communication networks using technologies such as IEEE 802.15.1, Zigbee, Bluetooth, RFID, IETF ROLL, ISA 100.11a, and so forth. Or, the local networks include communication networks using technologies such as PLC, M-BUS, Wireless M-BUS, KNX, and so forth. Furthermore, M2M area network 800 may include communication network for vehicle, such as controller area network (CAN), local interconnect network (LIN), and FlexRay. M2M are network 800 may also include a building automation and control network (BACnet), as a building automation network, and a consumer electronic bus (CEBus) and LonTalk, as a home automation network.

In order to expand a M2M network, a M2M system accepts such local area networks as M2M area network. M2M area network 800 might be a different type of a network as compared to the network domain including core network 400 and access network 500. Accordingly, communication between M2M area network 800 and the network domain may be communication between heterogeneous networks.

M2M gateway 700 is a gateway that runs M2M applications using M2M service capabilities. M2M gateway 700 acts as a proxy between M2M devices and the network domain. For example, M2M gateway 700 connects indirect connectivity type M2M devices 600-2 and 600-3 to access network 500 through M2M area network 800. M2M gateway 700 includes M2M service capabilities and M2M functions.

Such M2M gateway 700 may provide service to other devices (e.g., legacy) connected to it that are hidden from the network domain. For example, M2M gateway 700 may run an application that collects and treats various information (e.g., from sensors and contextual parameters). That is, M2M gateway 700 collects information from indirect connectivity type M2M devices 600-2 and 600-3. The collected information may include information on operation states of M2M devices 600-2 and 600-3, information on events captured by M2M devices 600-2 and 600-3, and data measured or sensed by M2M devices 600-2 and 600-3. For example, the collected information may be information on a payment made by a consumer using a predetermined payment card when M2M device 600-2 or 600-3 is a payment terminal (e.g., POS terminal). Such payment information may include information on the payment card, a purchase, and authentication data for payment.

As described, in order to provide a M2M service, M2M devices 600-1 to 600-3 and M2M gateway 700 may provide data collection and report capability, remote control capability, group communication capability, one-to-one communication capability, transaction processing capability, application enablement (DAE) capability, generic communication (DGC) capability, reach-ability, addressing and repository capability, communication selection capacity, remote entity management capability, security capability, history and data retention capability, transaction management capability, interworking proxy capability, and compensation brokerage capability.

As described, M2M communication is about communication between two machines. Accordingly, M2M communication requires security capabilities for authenticating devices in an associated network and for protecting data of each device. Particularly, for M2M device security, M2M communication requires data confidentiality, data integrity, gateway and server authentication, privacy, and traceability. For M2M gateway security, M2M communication requires data integrity, data confidentiality, system usability, and device and server authentication. For access network security, M2M communication requires data confidentiality, data integrity, and device and gateway authentication.

In order to protect data of M2M devices and authenticate M2M devices, the network domain includes network security capability and the M2M device and gateway domain includes device security capability and gateway security capability. The network security capability of the network domain i) supports M2M service bootstrap, ii) supports key hierarchy realization for authentication and authorization, iii) performs mutual authentication and key agreement, and iv) verifies the integrity validation status reported by M2M devices and M2M gateway and trigger appropriate post validation actions. The device security capability performs data integrity procedures for preventing data modification in data transmission. For example, the device security capability i) supports M2M service bootstrap, ii) supports key hierarchy realization for authentication and authorization, iii) initiates mutual authentication and key agreement, and iv) report the integrity validation status to the NSEC and react to post validation actions triggered by network security capability (NSEC). The gateway security capability i) supports M2M service bootstrap, ii) support key hierarchy realization for authentication and authorization, iii) initiates mutual authentication and key agreement, iv) reports the integrity validation status to the NSEC and reacts to post validation actions triggered by NSEC, v) is responsible for the storage and handling of M2M connection keys As described, M2M area network 800 may be formed by indirect connectivity type M2M devices 600-2 and 600-3 and M2M gateway 700 using typical wireless communication technologies, such as Zigbee, ultra-wideband (UWB), and Bluetooth. In such M2M area network 800, a malicious device having a certain feature can scan signals transmitted from a M2M device or a M2M gateway. Based on such scanned signal, the malicious device can illegally join M2M area network 800. That is, the malicious device can illegally capture personal data of M2M devices or the measured or sensed data of M2M devices in M2M area network 800. Furthermore, the malicious device can modify the illegally captured data. Accordingly, it is necessary to authenticate such illegal malicious devices, to protect such personal data and measured/sensed data of a M2M device from illegal data capture and modification, and to limit access rights in M2M communication, especially in M2M area network 800.

In order to secure data of M2M devices (e.g., 600-2 and 600-3) in M2M area network (e.g., 800), a M2M device encrypts sensed/measured data and generates a data packet in a predetermined communication standard format by including the encrypted data in a payload thereof in accordance with at least one embodiment. Furthermore, such a M2M device encrypts a device ID and a subscriber ID with the sensed/measured data for device and subscriber authentication. In order to encrypt such data, a M2M device includes a universal integrated circuit card (UICC) in accordance with at least one embodiment. Hereinafter, such a M2M device in a M2M area network will be described in detail with reference to FIG. 2. For convenience and ease of understanding, the M2M device in accordance with at least one embodiment will be described as an indirect connectivity type M2M device coupled in a M2M area network, but the present invention is not limited thereto. The configuration of the M2M device in accordance with at least one embodiment can be applied to any device that collects data associated with a target service and provides the collected data to an associated service server as well as a direct connectivity type M2M device.

Figure 2:
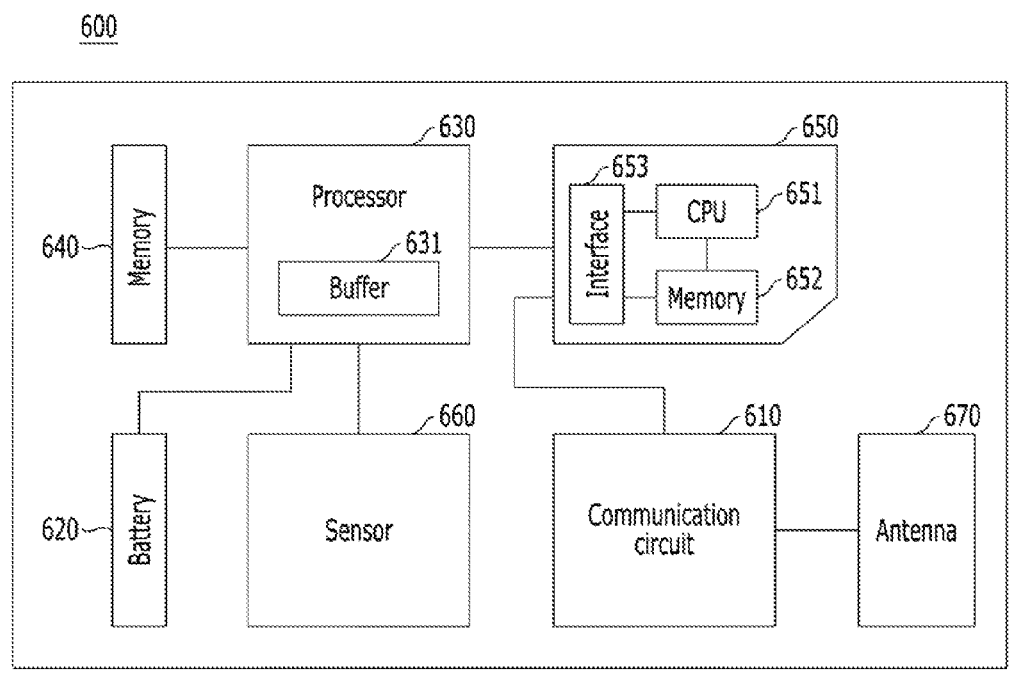
FIG. 2 illustrates a M2M device in accordance with at least one embodiment.

FIG. 2 illustrates a M2M device in accordance with at least one embodiment.

Referring to FIG. 2, M2M device 600 includes communication circuit 610, battery 620, processor 630, memory 640, identification circuit 650, sensor 660, and antenna 670. As described, M2M device 600 secures personal data and/or measured/sensed data from malicious attacks in M2M area network 800. For example, M2M device 600 may be an indirect connectivity type M2M device coupled in a Zigbee network. Particularly, M2M device 600 includes identification circuit 650 for storing information on a device ID and a subscriber ID and for encrypting data and generating a data packet in a certain communication standards format (e.g., hypertext transfer protocol secure: HTTPS) by including the encrypted data in a payload in accordance with at least one embodiment. Hereinafter, the constituent elements of M2M device 600 will be described in detail.

Communication circuit 610 transmits data to other entities or receives data from other entities trough communication networks including core network 400, access network 500, and M2M area network 800. Communication circuit 610 is coupled to antenna 670 for transmitting and receiving data. Particularly, communication circuit 610 transmits encrypted information to an external server (e.g., M2M application server 100) via antenna 670. The encrypted information may include information on events captured in M2M device 600, measured or sensed data by sensor 660, and operation status (e.g., a battery level) of M2M device 600. Furthermore, communication circuit 610 receives data from other entities including an external server (e.g., M2M application server 100) and other M2M devices and M2M gateway 700 and outputs the received data to processor 630.

Processor 630 controls constituent elements of M2M device 600 in general. Processor 630 includes buffer 631 for temporally storing information obtained from sensor 660. Processor 630 is coupled to identification circuit 650 and sensor 660.

Memory 640 stores information associated with M2M device 600, for example, an operating system, applications, data collected through sensor 660, operation results, operation status obtained from constituent elements such as battery 620, and so forth. Memory 640 may be a nonvolatile memory coupled to processor 630. Such memory 640 temporally stores information, which is sensed from sensor 660 and encrypted by identification circuit 650. The information includes not only the sensed data but also information on events generated or indicated in M2M device 600, monitored operation status of predetermined constituent elements of M2M device 600, environmental data collected from peripheral area, and so forth.

Although memory 640 is illustrated as a memory externally installed from processor 630, the present invention is not limited thereto. Memory 640 may be an internal memory included in processor 630. Since processor 630 has been miniaturized, M2M devices are often equipped with an external memory for larger storage capacity.

Sensor 660 senses predetermined events and collects information thereof according to a usage purpose of M2M device 600 or a M2M service associated with M2M device 600. That is, according to the associated M2M service or the usage purpose, sensor 660 may collect different type of information. For example, sensor 660 may be a thermometer, a hygrometer, or a barometer for measuring temperature, humidity, or atmospheric pressure of peripheral environment around M2M device 600. Sensor 660 may be a meter for measuring an amount of gas usage, electricity usage, or water usage. Furthermore, sensor 660 collects information on events captured or indicated by M2M device 600. For example, sensor 660 may be a motion sensor to capture motions around M2M device 600. Sensor 660 may be a healthcare sensor for measuring body temperature, for measuring pulses, or for sounding alarm when body temperature drops below a certain degree. Sensor 660 may be a credit card reader for reading information on a credit card. Sensor 660 may be a radio-frequency identification (RFID) reader, a bar-code reader, a quick response (QR) code reader, or so forth.

As described, sensor 660 collects predetermined information and transfers the collected information to processor 630 or identification circuit 650 or stores the collected information in memory 640.

Identification circuit 650 is a circuit storing various types of information for authenticating a use right of M2M device 600 and ensures the integrity and security of data in M2M device 600. For example, identification circuit 650 may store information on a device ID and a subscriber ID of M2M device 600, which are used for provisioning. Such identification circuit 650 may include a user identity module (UIM), a subscriber identity module (SIM), and a universal subscriber identity module (USIM). Particularly, identification circuit 650 may be realized as a smart card, a chip card, an integrated circuit card (ICC), or a universal integrated circuit card (UICC). That is, identification module 650 is a UICC attached to M2M device 600 in accordance with at least one embodiment.

In accordance with at least one embodiment, identification circuit 650 receives information collected by sensor 660 from processor 630, encrypts the received information, generates a data packet in a predetermined communication standard format by including the encrypted information in a payload thereof, and stores the generated data packet. Such identification circuit 650 includes central processing unit (CPU) 651, memory 652, and interface 653.

Memory 652 may store information on a device ID and a subscriber ID of M2M device 600. For example, the device ID is a unique identification assigned to M2M device 600. Based on such a device ID, M2M device 600 may be determined as whether it is registered or not. When M2M device 600 is registered at M2M server 100, M2M server 100 stores information on the device ID of M2M device 600 for device authentication. The device ID may be generated and assigned by a manufacturer of a M2M device. Alternatively, a multiple access control (MAC) address may be used as a device ID. In case of an android type device, an application ID (APP ID) may be used as a device ID.

Furthermore, the device ID may include information necessary for joining a target network. For example, the device ID includes information on a destination, a source, and an ID. Such a device ID may be a PAN ID or a network ID.

Memory 652 also stores information on an integrated circuit card identity (ICC ID) and an international mobile subscriber identity (IMSI), as the subscriber ID. The ICC ID is a unique ID of identification circuit 650 (e.g., UICC). Based on the ICC ID, an identification circuit of M2M device 600 can be determined as whether it is registered or unregistered. A telecommunication service provider assigns a unique ICC ID to each subscriber (e.g., a universal subscriber identity module (USIM), a software application for UMTS mobile telephony, which runs on a UICC).

Based on the IMSI, a subscriber of M2M device 600 can be determined as whether it is a registered subscriber or not. The IMSI is globally a unique identification associated with al cellular network. For example, the IMSI may be a telephone number assigned to a subscriber of a cellular network. The IMSI is configured of a public land mobile network (PLMN) identification and a mobile subscription identification number (MSIN). With the PLMN ID, a service provider can be identified. The MSIN is a telephone number for identifying a subscriber.

Interface 653 provides connection between identification circuit 650 and other constituent elements such as processor 630 and communication circuit 610. That is, interface 653 may be input/output circuits of identification circuit 650.

CPU 651 of identification circuit 650 receives information from processor 630 through interface 653 and encrypts the received information with the device ID and the subscriber ID stored in memory 652 in accordance with at least one embodiment. The received information includes data sensed or measured by sensor 660, information on events generated in M2M device 600, operation status of predetermined constituent elements of M2M device 600, environmental data collected from peripheral area, and so forth. Furthermore, CPU 651 uses a predetermined key used in provisioning of M2M device 600 in order to encrypt the received information. For example, CPU 651 uses a public key infrastructure (PKI) used in provisioning of identification circuit 650 or use a hashing function used for converting a key value to an address of a predetermined memory sector for storing information.

CPU 651 generates a data packet by including the encrypted information in a payload thereof in a predetermined communication standard format, such as a HTTPS, in accordance with at least one embodiment. Furthermore, CPU 651 stores the generated data packet in memory 640.

In addition, CPU 651 may include a Java Platform, a universal subscriber identity module (USIM) applet, a smart card web server (SCWS), a database management system (DBMS), a database (DB), and a gateway. Interface 653 includes an IC-USB port and an ISO-7816 port.

The smart card web server (SCWS) may provide remote management of services (e.g., applet) and contents, security management for supporting HTTPS, authentication management for a PKI authentication procedure, and comparability for exchanging data according to HTTPS regardless of a platform when data is transmitted to an external entity. Accordingly, the smart card web server improves efficiency of a M2M network system coupled to various types of platforms in various types of equipment. The smart card web server may also enable monitoring M2M device 600 in real time when there is attempting for breaking M2M device 600 down. That is, the smart card web server provides convenience in providing network log data.

The DB and the DBMS may manage the encrypted data stored in external memory 640. Such a DB may be stored in memory 652 of identification circuit 650. The DB includes indexes of data packets stored in memory 640. Since the DB is included in identification circuit 650 although the encrypted data stored in external memory 640, data security becomes more enhanced. For example, in response to a request of transmitting specific data from a service server, the requested data is searched and fetched from memory 640 based on an index of the requested data, which is stored in the DB. The fetched data is transmitted to the service server. Particularly, the DB, the DBMS, and the SCWS enable a service server to access a desired M2M device and to retrieve one of data packets stored in a memory thereof. Since it does not require decoding the requested data (e.g., encrypted data with a device ID and a subscriber ID), the requested data can be retrieved and transmitted to the service server quicker. Furthermore, instead of receiving a request from a service server, a group of data packets stored in memory 640 might be transmitted to application server 100 at a regular interval or upon the generation of predetermined event.

CPU 651 of identification circuit 650 was described as encrypting the information and generating the data packet by including the encrypted information in a payload thereof, but the present invention is not limited thereto. Processor 630 of M2M device 600 may perform the same instead of CPU 651 of identification circuit 650.

As described, M2M device 600 encrypts sensed or measured data with a device ID and a subscriber ID and generates a data packet by including the encrypted data in a payload thereof. M2M device 600 stores the generated data packet in memory 640 and transmits the stored data packet to M2M application server 100 in response a request thereof in accordance with at least one embodiment. Hereinafter, such operation of M2M device 600 will be described with reference to FIG. 3.

Figure 3:
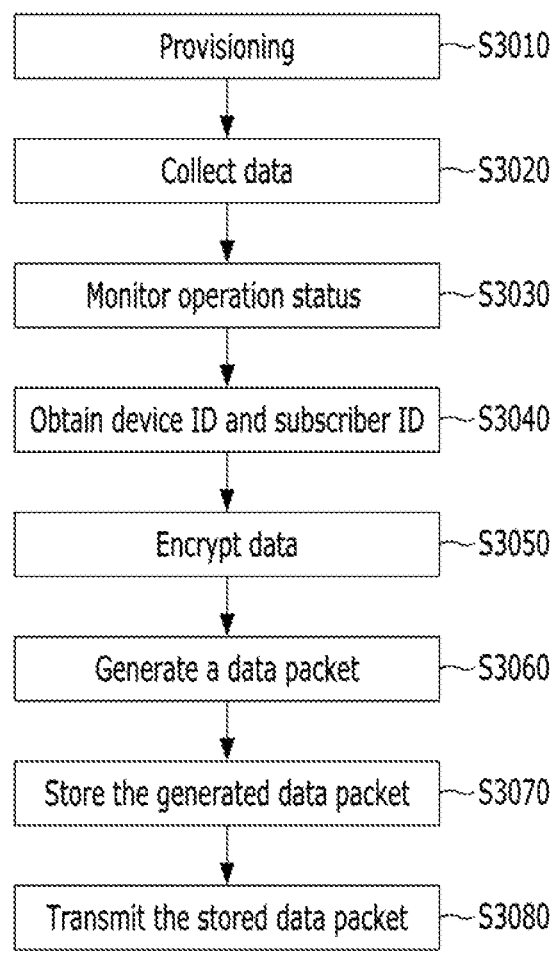
FIG. 3 illustrates a security management method of a M2M device in a M2M area network in accordance with at least one embodiment.

FIG. 3 illustrates a security management method of a M2M device in a M2M area network in accordance with at least one embodiment.

Referring to FIG. 3, M2M device 600 performs provisioning at step S3010. For example, as provisioning, M2M device 600 performs a registration procedure at M2M application server 100 for a predetermined M2M service. That is, M2M device 600 may register a device ID and a subscriber ID thereof at M2M application server 100 for the predetermined M2M service. For example, the device ID may be a unique hardware ID, a MAC address assigned to M2M device 600, and an App ID of an android terminal. The subscriber ID may include an integrated circuit card identity (ICC ID) and an international mobile subscriber identity (IMSI) of identification circuit 650 (e.g., UICC).

At step S3020, M2M device 600 collects predetermined data and temporally stores the collected data. For example, various types of M2M devices are deployed around target areas for collecting predetermined information from peripheral environment, information on events generated at or indicated by M2M devices, and information from other entities. M2M devices may measure temperature, humidity, air pressure, an amount of electricity usage, an amount of gas usage, an amount of water usage, body temperature, blood pressure, and so forth. Furthermore, a M2M device reads information on a credit card for making a payment of a purchase.

Such sensed or measured data may be stored in a temporal storage (e.g., buffer 631) of M2M device 600, before storing the collected data in memory 640. M2M device 600 collects such data at a predetermined regular interval or upon a predetermined event. The predetermined event may be the receipt of a predetermined signal from other entity and the generation of payment transaction.

For example, upon the generation of a predetermined event, M2M device 600 collects information on the generated event. Or, M2M device 600 may receive information related to the predetermined event from a user. For example, when the predetermined event is making a payment using a payment card, M2M device 600 may receive information related to the payment, such as a payment method (e.g., a payment card type), a price, a purchase, a consumer, and a merchant. When M2M device 600 is a mobile payment terminal (e.g., smart phone), M2M device 600 might obtain information on a payment method (e.g., a credit card) directly from a consumer or M2M device 600 might read such information from a credit card of a consumer using a credit card reader as sensor 660. Such a method of obtaining information might be embodied in various ways and well known in the art. The detailed description thereof is omitted herein.

At step S3030, M2M device 600 monitors operation status at a regular interval or upon the generation of a predetermined event and stores information on the monitoring result. Such monitoring operation step S3030 is described as an independent operation step from the data collection operation step S3020, but the present invention is not limited thereto. For example, the monitoring operation step S3030 is performed simultaneously with the data collection operation step S3020.

M2M device 600 regularly monitors operation status thereof. The operation status may be a remaining battery level or errors generated during communication. Such monitoring information may be collected at a predetermined regular period or upon the generation of a predetermined event. The predetermined event might be the initiation of certain operation. Such predetermined event might be set by a user or an operator. Such monitoring information (e.g., the remaining battery level) may be used for analyzing a malfunction statue of each M2M device and for dealing with the malfunction statue of each M2M device.

At step S3040, M2M device 200 obtains a device ID and a subscriber ID. The device ID is obtained for device authentication and the subscriber ID is obtained for subscriber authentication. For example, M2M device 600 obtains a device ID and a subscriber ID from identification circuit 650. As the subscriber ID, M2M device 600 obtains an ICC ID and an IMSI from a UICC equipped as identification circuit 650.

At step S3050, M2M device 600 encrypts the sensed or measured data, the information on the operation status, and the obtained device ID and subscriber ID. For example, M2M device 600 may use various types of methods for encoding the generated packet. For example, M2M device 600 uses an encryption key used in provisioning of M2M device 600. Particularly, M2M device 600 uses a public key infrastructure (PKI) used in provisioning of identification circuit 650 for encryption. Furthermore, M2M device 600 may uses a hashing function used for converting a key value to an address of a predetermined memory sector for storing information.

At step S3060, M2M device 600 generates a data packet in a predetermined communication standard format by including the encrypted data in a payload thereof. For example, M2M device 600 generates the data packet in a hypertext transfer protocol secure (HTTPS) format, which is a communications protocol for secure communication over a computer network.

At step S3070, M2M device 600 stores the generated data packet in memory 640. M2M device 600 stores the data packet generated in a predetermined communication standard format in memory 640 for enhancing data security in M2M device 600. As described, the generated data packet is stored in memory 640 and an index thereof is stored in a database (e.g. memory 652) in identification circuit 650. In this way, a specific data packet can be retrieved based on an index thereof without deciding a payload thereof in response to a request from application server 100.

Although the generated data packet is described as being stored in memory 640, the present invention is not limited thereto. The generated data packet may be transmitted to a predetermined server without storing them in memory 640.

At step S3080, M2M device 600 transmits the stored data packet to an external server (not shown) upon the generation of a predetermined event. For example, M2M device 600 may transmit the data packet to the external server regularly. Or, M2M device 600 may transmit the data packet in response to a request from the external server.

As described, M2M device 600 generates a single data packet in a HTTPS format by including the encrypted data with the device ID and the subscriber ID in the payload thereof, in accordance with at least one embodiment. Such single data packet will be described in detail with reference to FIG. 4.

Figure 4:
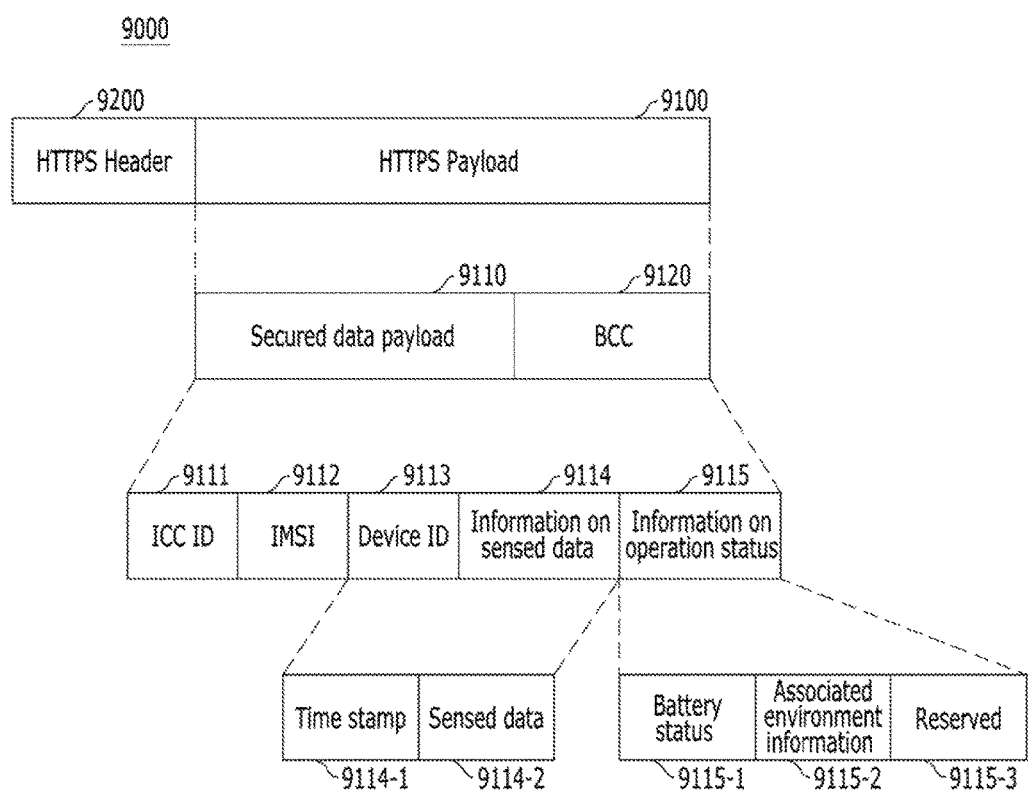
FIG. 4 illustrates a data packet in accordance with at least one embodiment.

FIG. 4 illustrates a data packet in accordance with at least one embodiment.

Referring to FIG. 4, M2M device 600 generates single data packet 900 in the HTTPS format. Such generated single data packet 900 includes HTTPS header 9200 and HTTPS payload 9100.

HTTPS payload 9100 includes secured data payload 9110 and block check code (BCC) 9120. Secured data payload 9110 is a region for containing the encrypted data with the device ID and the subscriber ID. Such secured data payload 9110 also contains information on operation status and peripheral environment, as described. BCC 9120 includes a block check code for checking error generation during data transmission.

Particularly, secured data payload 9110 includes a device ID for identifying a M2M device (e.g., device authentication or authorization), a subscriber ID for identifying a subscriber or an identification circuit (e.g., subscriber authentication or authorization), the collected data, the monitoring information on operation status, and the information on peripheral environment. Such secured data payload 9110 is encrypted through a predetermined encryption process in accordance with at least one embodiment.

For example, secured data payload 9110 may include ICC ID 9111, IMSI 9112, device ID 9113, sensed or measured data 9114, and information on operation status 9115. Sensed or measured data 9114 may include information on a time of sensing or measuring data 9114-1 and the sensed or measured data 9114-2. The information on operation status 9115 includes battery data 9115-1, environmental information 9115-2, and reserved 9115-3. When a M2M device does not include a battery, battery data 9115-1 contains a predetermined number, such as 0XFFF.

As described, an indirect connectivity type M2M device in a M2M area network includes a UICC as an identification circuit for enhancing security management in a M2M area network in accordance with at least one embodiment. Hereinafter, such security management in a M2M area network will be described based on a M2M device equipped with a UICC as an identification circuit with reference to FIG. 5.

Figure 5:
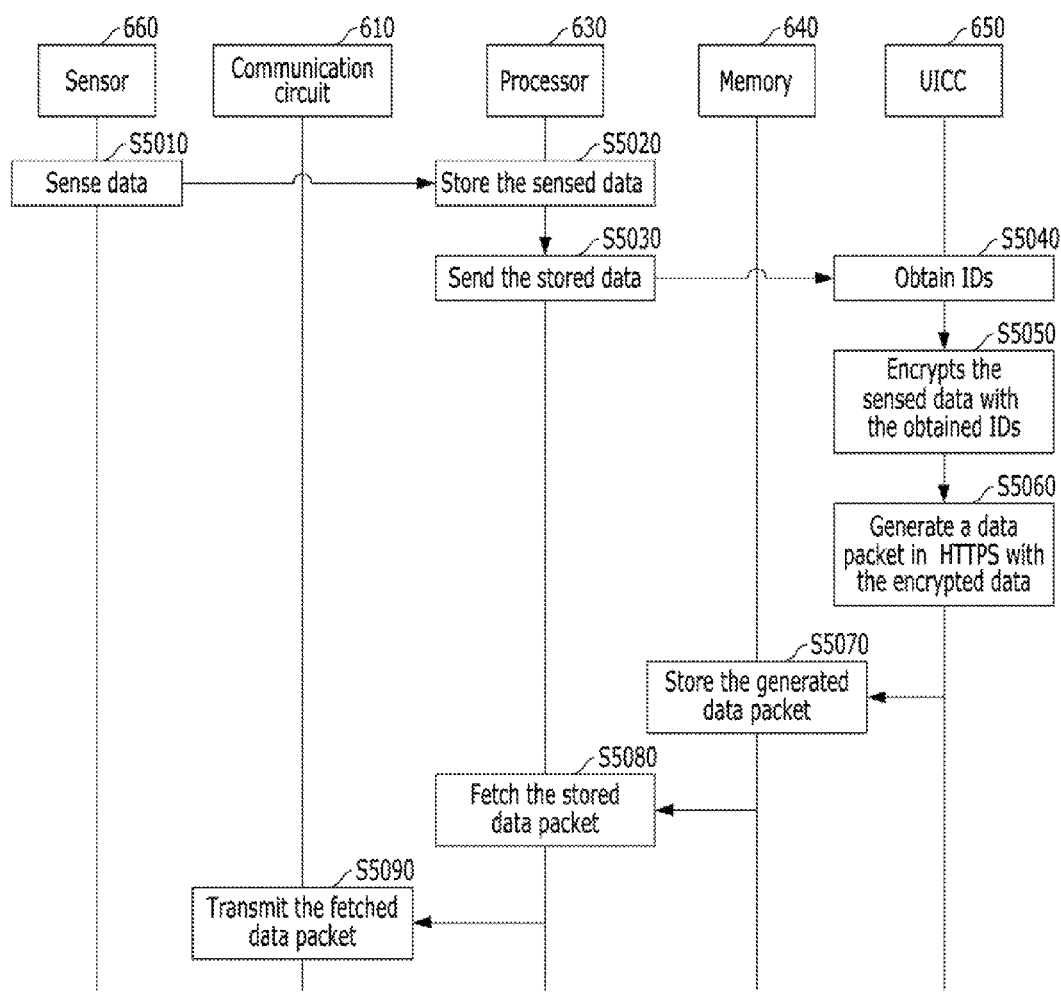
FIG. 5 illustrates a security management method of a M2M device having a UICC in M2M area network in accordance with at least one embodiment.

FIG. 5 illustrates a security management method of a M2M device having a UICC in M2M area network in accordance with at least one embodiment.

Referring to FIG. 5, sensor 660 of M2M device 600 collects data associated with a target M2M service at step S5010. Processor 630 of M2M device 600 temporally stores the collected data in buffer 631 at step S5020. Processor 630 obtains the stored data from buffer 631 and transfers the obtained data to UICC 650 at step S5030.

At step S5040, UICC 650 receives the sensed data through interface 653 and obtains a device ID, an ICC ID, and an IMSI from memory 652. At step S5050, CPU 651 of UICC 650 encrypts the sensed data with the device ID, the ICC ID, and the IMSI using a public key infrastructure (PKI) used in provisioning of UICC 650 or a hashing function used for converting a key value to an address of a predetermined memory sector for storing information.

At step S5060, CPU 651 of UICC 650 generates a data packet in a HTTPS format by including the encrypted data in a payload thereof. At step S5070, memory 640 of M2M device 600 stores the generated data packet. At step S5080, processor 630 of M2M device 600 fetches the data packet stored in memory 640 upon the generation of a certain event. At step S5090, processor 630 transmits the fetched data packet to an external server (not shown) through communication circuit 610.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of security management in a machine to machine (M2M) device having an attachable and detachable identification circuit, the method comprising:
sensing, by the M2M device, data associated with a target M2M service; and
encrypting, by the attachable and detachable identification circuit, the sensed data with a device identification (ID) of the M2M device and at least one subscriber ID of the identification circuit,
wherein:
the sensing comprises monitoring, by the M2M device, operation status of the M2M device and collecting information on the monitored operation status; and
the encrypting comprises encrypting the sensed data with the collected information on the monitored operation status of the M2M device.

2. The method of claim 1, further comprising:
generating, by the attachable and detachable identification circuit, a data packet in a predetermined format by including the encrypted data in a payload of the data packet; and
transmitting, by the M2M device, the generated data packet to an associated service server through a communication network.

3. The method of claim 1, wherein the encrypting data comprises:
encrypting, by the attachable and detachable identification circuit, the sensed data using one of a public key infrastructure (PKI) and a predetermined hashing function.

4. The method of claim 1, wherein the predetermined format is a hypertext transfer protocol secure (HTTPS) format.

5. The method of claim 1, wherein the M2M device is an indirect connectivity type M2M device coupled to a Zigbee M2M area network.

6. The method of claim 1, wherein the at least one subscriber ID includes an integrated circuit card identity (ICC ID) and an international mobile subscriber identity (IMSI).

7. The method of claim 1, comprising:
temporally storing the sensed data and the information on the monitored operation status in a buffer of a processor of the M2M device; and
storing the generated data packet in a memory of the M2M device.

8. A device comprising:
a sensor configured to collect data associated with a target service provided through the device;
a processor configured to store the sensed data in a buffer;
a device memory configured to store information associated with the device;
an attachable and detachable identification circuit configured to receive the sensed data from the buffer of the processor, generate data packet in a predetermined format by encrypting the sensed data, and store the generated data packet in the device memory; and
a communication circuit configured to read the data packet stored in the device memory and to transmit the data packet to an associated service server through communication networks,
wherein:
the processor is configured to monitor operation status of the device, to collect information on the monitored operation status, and to store the collected information of the monitored operation status; and
the attachable and detachable identification circuit is configured to encrypt the sensed data with the collected information of the monitored operation status together with at least one of the device ID and the subscriber ID.

9. The device of claim 8, wherein the attachable and detachable identification circuit is configured to:

encrypt the sensed data with a device identification (ID) and a subscriber ID;

generate a data packet in a predetermined communication standard format by including the encrypted data in a payload of the data packet; and store the generated data packet in the device memory of the device.

10. An attachable and detachable identification circuit attached to a device for providing a machine to machine (M2M) service, the attachable and detachable identification circuit comprising:

a circuit memory configured to store a device identification (ID) of the device and a subscriber ID of the attachable and detachable identification circuit;

an interface configured to provide connection between the attachable and detachable identification circuit and constituent elements of the device; and a central processing unit configured to receive data from the device to encrypt the sensed data with at least one of the device ID and the subscriber ID, to generate a data packet in a predetermined format by including the encrypted data, and to store the generated data packet in the device through the interface.

11. The attachable and detachable identification circuit of claim 10, wherein the central processing unit is configured to encrypt the sensed data using one of a public key infrastructure (PKI) and a hashing function and to generate the data packet in a hypertext transfer protocol secure (HTTPS) format.

12. The attachable and detachable identification circuit of claim 10, wherein the attachable and detachable identification circuit includes a user identity module (UIM), a subscriber identity module (SIM), and a universal subscriber identity module (USIM).

13. The attachable and detachable identification circuit of claim 10, wherein the attachable and detachable identification circuit is at least one of a smart card, a chip card, an integrated circuit card (ICC), and a universal integrated circuit card (UICC).

* * * * *